US012500007B2

(12) United States Patent
Kumar Gupta et al.

(10) Patent No.: US 12,500,007 B2
(45) Date of Patent: Dec. 16, 2025

(54) RADIATION SHIELDING RED MUD BASED HYBRID COMPOSITE PANEL AND PROCESS FOR PREPARING THE SAME

(71) Applicant: COUNCIL OF SCIENTIFIC AND INDUSTRIAL RESEARCH AN INDIAN REGISTERED BODY INCORPORATED UNDER THE REGN. OF SOC. ACT (ACT XXI OF 1860), New Delhi (IN)

(72) Inventors: Manoj Kumar Gupta, Bhopal (IN); Pappu Asokan, Bhopal (IN); Sanjai Kumar Singh Rathore, Bhopal (IN); Avanish Kumar Srivastava, Bhopal (IN); Teerthraj Verma, Chowk Lucknow (IN); Anit Parihar, Chowk Lucknow (IN)

(73) Assignee: COUNCIL OF SCIENTIFIC AND INDUSTRIAL RESEARCH AN INDIAN REGISTERED BODY INCORPORATED UNDER THE REGN. OF SOC. ACT (ACT XXI OF 1860), New Delhi (IN)

( * ) Notice: Subject to any disclaimer, the term of this patent is extended or adjusted under 35 U.S.C. 154(b) by 842 days.

(21) Appl. No.: 17/755,140

(22) PCT Filed: Feb. 17, 2021

(86) PCT No.: PCT/IN2021/050150
§ 371 (c)(1),
(2) Date: Apr. 21, 2022

(87) PCT Pub. No.: WO2021/165988
PCT Pub. Date: Aug. 26, 2021

(65) Prior Publication Data
US 2022/0399136 A1    Dec. 15, 2022

(30) Foreign Application Priority Data
Feb. 19, 2020 (IN) .............................. 202011007069

(51) Int. Cl.
G21F 1/04    (2006.01)
G21F 3/00    (2006.01)

(52) U.S. Cl.
CPC .............. *G21F 1/045* (2013.01); *G21F 1/047* (2013.01)

(58) Field of Classification Search
CPC .................................... G21F 1/04; G21F 3/00
USPC ......................................................... 524/80
See application file for complete search history.

(56) References Cited

U.S. PATENT DOCUMENTS

| 7,041,995 | B2 | 5/2006 | Eder |
| 7,449,705 | B2 | 11/2008 | Eder |
| 7,524,452 | B2 | 4/2009 | Amritphale et al. |
| 7,897,949 | B2 | 3/2011 | Ballsieper |
| 8,728,349 | B2 | 5/2014 | Liu et al. |
| 2017/0257987 | A1 | 9/2017 | Amritphale et al. |

FOREIGN PATENT DOCUMENTS

| DE | 19955192 A1 | 5/2001 | |
| WO | WO-2019211862 A1 * | 11/2019 | ............. C04B 18/04 |
| WO | WO-2020121319 A1 * | 6/2020 | ............. B29C 43/02 |
| WO | WO-2021165988 A1 | 8/2021 | |

OTHER PUBLICATIONS

"International Application No. PCT/IN2021/050150, International Search Report and Written Opinion mailed May 19, 2021", (May 19, 2021), 16 pgs.
Guru, Sapana, et al., "Multicomponent red mud-polyester composites for neutron shielding application", Materials Chemistry and Physics, vol. 224 [abstract only], (Dec. 15, 2018), 369-375.
Mccaffrey, J. P., et al., "Radiation Attenuation by Lead and non-Lead Materials Used in Radiation Shielding Garments", Med. Phys. 34(2), (Jan. 18, 2007), 530-537.
Vairavan, Manikandan, et al., "Study of Tribological Properties of Nano-Sized Red Mud Particle-Reinforced Polyester Composites", Transactions of the Indian Institute of Metals, 72 [abstract only], (May 25, 2019), 2417-2431.
Verma, Sarika, et al., "Development of advanced, X-ray radiation shielding panels by utilizing red mud-based polymeric organo-shielding gel-type material", Waste and Biomass Valorization, 2017, 8, 2165-2175, (Sep. 28, 2016), 2165-2175.

* cited by examiner

*Primary Examiner* — Deve V Hall
(74) *Attorney, Agent, or Firm* — Schwegman Lundberg & Woessner, P.A.

(57) ABSTRACT

The present invention relates to a lead free glossy finish hybrid radiation shielding composite panel comprising: a) 40-70% of industrial waste red mud and 30-60% of epoxy/polyester resin with or without glass fibre, wherein the composite panel has density in the range of 1.4-2.2 g/cc; water absorption in the range of 0.20-0.30%; tensile strength in the range of 12-120 MPa; tensile modulus in the range of 1.5-7.5 GPa; and half value layer in the range of 0.36-0.47 cm and 0.48-0.52 cm for X-ray beam energies of 60 and 100 kVp, respectively. The present invention also describes a low temperature process for manufacturing the composite panels. Moreover, the developed composite panel is a unique material and have multifunctional applications in wider spectrum as high energy electromagnetic radiation shielding doors, panels, partition panels and as roofing sheets.

12 Claims, 5 Drawing Sheets

RADIATION SHIELDING RED MUD BASED HYBRID COMPOSITE PANEL AND PROCESS FOR PREPARING THE SAME

PRIORITY CLAIM TO RELATED APPLICATIONS

This application is a U.S. national stage filing under 35 U.S.C. § 371 from International Application No. PCT/IN2021/050150, filed on 17 Feb. 2021, which claims priority to India application No. 202011007069, filed on 19 Feb. 2020. This application incorporates by reference the entirety of International Application No. PCT/IN2021/050150 and its published version WO2021/165988 (published 26 Aug. 2021).

FIELD OF THE INVENTION

The present invention relates to a hybrid composite panel, particularly relates to radiation shielding red mud based hybrid composite sheet. More particularly, the present invention relates to a process of making high moisture resistant radiation shielding green hybrid polymer composite panels or sheets with high mechanical strength using industrial red mud waste particulates with epoxy/polyester resin with or without glass fibres.

BACKGROUND OF THE INVENTION

Unwanted exposures to high-energy electromagnetic radiations such as X-ray or gamma ray are hazardous to human health and life. Particularly, during last two decades the use of X-ray radiation has gain extensive popularity covering all sectors of human life, industry, security, aviation and medical care. Specially, in medical radiation applications, X-ray are utilised for treating cancer patients, severe thyroid eye disease, abnormal growth of mucosal tissue (pterygium) etc. During operation and handling of the X-ray, tissues and organ near the affected region of treatment usually got exposed to the penetrative X-rays leading to harmful side effects to both internal and superficial organs. Thus, the safety of the personal and general public from the harmful effect of radiation has been a great concern. Conventionally, X-ray procedures radiation safety has been achieved using L-bench and lead apron and adequate room shielding. Presently, lead based apron is utilised as for radiation shielding during operation of X-Ray machine. However, lead is extremely toxic and prolonged exposure to it can result in serious health concerns. To construct the diagnostic and computed tomography (CT) scanner rooms, the ceramic tiles, concrete and bricks are utilised to provide adequate shielding against X-ray photons. However, moisture resistant along with high mechanical strength radiation shielding hybrid composite sheet without using lead or lead based compound materials for application as radiation shielding doors, panels, false ceiling, partition panels and roofing sheet using industrial waste particulate such as red mud are yet not developed.

Earlier work in U.S. Pat. No. 7,897,949B2 claimed a radiation shielding multi-layer materials, comprising at least two individual composite layers, where in each individual composite layer comprises a secondary radiation layer with a low Z radiation protection material and a barrier layer with a high Z radiation protection material (tantalum and/or bismuth and/or tungsten). In this work fibres/PVC are used as outer layer in each individual component. Reference may be made to U.S. Pat. No. 7,041,995B2, wherein a lead substitute material for radiation protection purposes is reported. Composite structure of lead substitute material such as 10-20% by weight of a matrix material, Sn, or Sn compounds, Bi, or Bi compounds, nominal lead equivalent are used to prepare the radiation shielding materials. Similarly, various other radiation shielding materials on the basis of the atomic numbers are invented. Reference may be made to the DE19955192 A1, wherein a method for producing a radiation protection material from a powder of a metal with a high atomic number and polymer as the matrix material are used. In other work, highly elastic, lightweight, flexible and rubber-like radiation protection material, with an atomic number greater than or equal to 50 and their oxides are mixed with polymer to develop the radiation shielding materials. Lead free radiation protection material comprising at least two layers with different shielding characteristics are developed and their methods are claim in the U.S. Pat. No. 7,449,705 B2. In this work, two layers are used made from tin, cerium and matrix material as first layer and gadolinium, bismuth, tungsten and matrix as second layer. However, their processing is complex and costly. The moisture resistant and mechanical properties of these materials are not reported.

U.S. Pat. No. 8,728,349B2 discloses a method for lead-free X-ray shielding rubber composite which contained polymerized rare earth organic complex metal tin and/or tin compound bismuth element and/or inorganic compound and silane coupling agent and softener crosslinker. However, density, moisture/water absorption, mechanical strength of developed materials was not given and their application as radiation shielding building materials is limited. In present invention, industrial waste particulates such as red mud is processed using simple methods such as hot water soaking and their drying in oven and compression moulding techniques is used to achieve the moisture resistant radiation shielding hybrid composite reinforced with red mud in single operation mode using compression moulding without using any lead element.

Reference may be made to US20170257987A1, wherein a brine sludge, an industrial waste generated in chloral alkali industry and sodium hexametaphosphate was utilised to make the non-toxic radiation shielding materials where a heating of the brine sludge is done in a furnace in the temperature range of 800 to 1300° C. for a period of 1 to 2. However, in this work, half value layer, density and mechanical strength for X-Ray radiation shielding are not reported.

In the present invention, industrial waste particulates such as red mud generated from aluminium industry is processed in oven in temperature range of 60-80° C. and reinforced in the epoxy resin using compression moulding method and is used to achieve the moisture resistant radiation shielding hybrid composite panels with density in range of 1.68-1.98 g/cc and half value layer in range of 0.34-0.50 cm.

Lead based and non-lead materials such as Pb—rubber, Pb—PVC vinyl, Hx—lead, W—rubber and Sn—Ba polymer were used to make radiation shielding garments to protect medical patients and workers from exposure to direct and secondary radiation during diagnostic imaging in hospitals, clinics and dental offices (J. P. McCaffrey et al., Radiation attenuation by lead and non-lead materials used in radiation shielding garments. *Med. Phys.* 34, 2007530-537.) However, such radiation shielding garments are not effective.

A facile method for the fabrication of X-ray radiation shielding panels using red mud, barium sulphate, carbon powder in organo-shielding gel are reported (Sarika Verma et al., Development of advanced, X-ray radiation shielding panels by utilizing red mud-based polymeric organo-shielding gel-type material, Waste and Biomass Valorization, 2017, 8, 2165-2175). In this work, high temperature ceramic processing at 1300° C. was carried out to make the radiation shielding organo-gel-based material. However, this work has various disadvantages such as high temperature annealing, using radiation shielding organo-gel, cost and limitation of materials dimensions. The developed materials have limited application for construction of diagnostic and CT scanner rooms to provide adequate shielding against X-ray photons. Further, this work has not reported any studies regarding half value layer, density and mechanical strength which is crucial to design the radiation shielding panels. However, in the present invention, industrial waste particulates such as red mud generated from aluminium industry is processed in oven in temperature range of 60-80° C. and reinforced in the epoxy resin using compression moulding method is used to achieve the moisture resistant radiation shielding hybrid composite panels with density in range of 1.68-1.98 g/cc and half value layer in range of 0.34-0.50 cm.

Reference may be made to U.S. Pat. No. 7,524,452B2, wherein a low temperature process for making radiopac materials utilizing industrial/agricultural waste as raw material is claimed. Ceramic materials using industrial/agricultural waste materials, an alkali or alkaline earth metal compound and phosphatic binder were utilised. However, in this work ceramic are prepared at temperature in the range of 920 to 1300° C. Further the fabrication of radiation shielding green hybrid composite panels using industrial waste particulates such as red-mud in epoxy/polyester resin system is not yet reported for application of radiation shielding doors, panels, false ceiling and roofing sheet.

There are various drawbacks in earlier developed process for making X-ray radiation shielding materials. The processes for fabricating X-ray radiation shielding materials based on lead metal, lead based compound and their polymer composites have toxicity and poor mechanical strength. Lead based compound radiation shielding materials have high density and need high temperature processing. The existing processes used more than two metal oxide materials and polymer and required high temperature treatment of raw materials. The use of cement based concrete for radiation shielding application exhibits high water absorption which results a gradual decreased in its mechanical strength with the period of radiation exposure.

The processing of red mud fly ash based concrete/cement for radiation shielding applications required high temperature of about 800-1000° C. and usually shows high water absorption. Red mud based concrete have limited application for radiation shielding application and can be used as only tiles/bricks and not suitable as radiation shielding doors, panels, partition panels and roofing sheet. Hence there has been a dire need for lead free radiation shielding composite panel and a simple process which involves low temperatures for making the lead free radiation shielding composite panels.

OBJECTIVE OF THE INVENTION

The main object of the present invention is to provide a high moisture resistant radiation shielding green polymer hybrid composite panels with high mechanical strength using industrial waste particulates red mud with epoxy/polyester resin with and without glass fabrics.

Another object of the present invention is to provide a process for preparing high moisture resistant radiation shielding green hybrid polymer composite panel with high mechanical strength using industrial waste particulates red mud with epoxy/polyester resin.

Another object of the present invention is to provide a process for making effective radiation shielding doors, panel, roofing sheet at low temperature which obviates the drawbacks as detailed above.

Another object of the present invention is to utilize industrial waste particulate specially red mud generated from aluminium production containing major elements namely iron, silicon, aluminium, titanium and calcium and thus fabricate polymeric sheets which are non-toxic as they are lead free. Still another object of the present invention is to develop a low temperature process for making large scale size of radiation shielding sheet utilizing above mentioned raw materials.

Still another object of the present invention is to develop moisture resistant radiation shielding sheet up to dimension of 220 cm×120 cm with varying thicknesses.

Still another object of the present invention is to fabricate a low temperature process for making glossy finish radiation shielding panels reinforced with epoxy/polyester resin system.

Still another object of the present invention is to fabricate the radiation shielding hybrid composite panels using nanoscale size of red mud process through high energy planetary ball mill.

Still another object of the present invention is to fabricate a low temperature process for making glossy finish radiation shielding hybrid composite panels reinforced with glass fabric under compressive moulding process system.

Still another object of the present invention is to fabricate high performance radiation shielding hybrid composite panels with variable mechanical strength and density.

Still another object of the present invention is to fabricate a and low cost process for making glossy finish radiation shielding hybrid composite panels reinforced with red mud and epoxy resin.

SUMMARY OF THE INVENTION

In the first aspect of the present invention, there is provided a lead free radiation shielding hybrid composite sheets comprising: a) 40-70% of industrial waste red mud; and b) 30-60% of epoxy/polyester resin with or without glass fibre, wherein the composite panel has density in the range of 1.4-2.2 g/cc; water absorption in the range of 0.20-0.30%; tensile strength in the range of 12-120 MPa; tensile modulus in the range of 1.5-7.5 GPa; and half value layer in the range of 0.36-0.47 cm and 0.48-0.52 cm for X-ray beam energies of 60 and 100 kVp, respectively.

In the second aspect of the present invention, there is provided a process for making lead free radiation shielding composite panel as disclosed herein through compressive moulding technique comprising the steps of: a) processing of industrial waste red mud followed by hot air oven curing to obtain a processed waste red mud; b) ball milling of the processed waste red mud using high energy planetary ball milling under a speed in the range of 200-300 rpm for a time period of 8 hours; c) homogeneous mixing of the ball milled processed waste red mud with epoxy/polyester resin to obtain a radiation shielding hybrid composite panel; d) casting under compression moulding of the radiation shielding hybrid composite panel and optionally calendaring of glass fibres and curing of radiation shielding hybrid composite panel at a temperature in the range of 25 to 60° C. to obtain a glossy finish red-waste mud radiation shielding hybrid composite panel; and f) demoulding of the glossy finish radiation shielding hybrid composite panel followed by curing to obtain lead free hybrid composite radiation shielding panel.

In the third aspect of the present invention, there is provided a lead free glossy finish radiation shielding hybrid composite panel produced by the process as disclosed herein, wherein the radiation shielding hybrid composite panel has density in the range of 1.4-2.2 g/cc, water absorption in the range of 0.20-0.30%, tensile strength and tensile modulus in the range of 12-120 MPa and 1.5-7.5 GPa; and flexural strength and flexural modulus in range of 24-120 MPa and 2.5-9.5 GPa, respectively, half value layer of 0.36-0.47 cm and 0.48-0.52 cm for X-ray beam energies of 60 and 100 kVp respectively.

DETAILED DESCRIPTION OF INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only". Throughout this specification, unless the context requires otherwise the word "comprise", and variations such as "comprises" and "comprising", will be understood to imply the inclusion of a stated element or step or group of element or steps but not the exclusion of any other element or step or group of element or steps.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature in the range of 60-120° C. should be interpreted to include not only the explicitly recited limits of 60° C.-120° C. but also to include sub-ranges, such as 61-119° C., and so forth, as well as individual amounts, within the specified ranges, such as 65.2° C., and 110.5° C.

The term "lead free glossy finish radiation shielding hybrid composite panel" refers to the radiation shielding composite panel obtained from industrial red mud waste which is devoid of toxic lead and prepared by the process as disclosed in the present invention. The term "composite panels" and "composite sheets" may be used interchangeably.

The term "industrial waste red mud" refers to the red mud obtained as residue in the refinement process of bauxite to alumina. In the present invention, the industrial red mud waste comprises 10-45% iron oxide, 5-20% alumina, 3-10% silica, 1-1.5% magnesium oxide, 0.5% potassium oxide, 0.5-1% calcium oxide, 0.2% lead oxide. The industrial red mud wastes are in the size ranging from 500 nm-175 µm and can be referred to as "red mud" or "red mud waste" or "red mud waste particulates" or "industrial red mud waste particulates".

The term "epoxy/polyester resin" refers to two polymer matrices i.e. epoxy resin or polyester resin. In the present invention, the epoxy/polyester resin is used for homogenous mixing of the ball milled processed red mud waste. Example of epoxy resin includes but not limited to Epoxy (Lapox B-11, Atul Ltd, India) as base material with aliphatic polyamine (Lapox K-6, Atul Ltd, India) as hardener. Example of polyester resin includes but not limited to polyester with methyl ethyl ketone peroxide (MEKP) and cobalt naphthenate as catalyst.

The term "density" herein refers to the mass density of a substance and is defined as mass per unit volume. The symbol most often used for density is p (the lower case Greek letter rho), although the Latin letter D can also be used. The technique used in the present invention for the measurement of density of the materials is ASTM 792-08.

The term "tensile strength" herein refers to refers to maximum convention (Tensile) stress that can be sustained by the materials before failure and is calculated based on the load applied corresponding to its area. The technique used in the present invention for the measurement of Tensile strength of the materials is according to ASTM D 638-10 using UTM, LRX Plus, Lloyd, UK. Young modulus and strain were calculated from the stress-strain data.

The term "tensile modulus" herein refers amount of stress applied to a material and dividing it by the strain the material undergoes. The technique used in the present invention for the measurement of Tensile Modulus of the materials is measured during material tensile testing using plot that has stress on the vertical axis and strain on the horizontal axis.

The term "half value layer" or "half-value thickness" used herein refers to the thickness of the material at which the intensity of radiation entering it is reduced by one half. The technique used in the present invention for the measurement of half value layer of the materials and is a standard test method for determining the attenuation properties in X-Ray beam of materials used, to protect against radiation generated during the use of X-Ray equipment. In the present invention half-value layer of the composite panels are in the range of 0.36-0.47 cm and 0.48-0.52 cm for X-ray beam energies of 60 and 100 kVp (kilovoltage peak), respectively.

The term "high energy planetary ball milling" refers to a device used for the efficient and precision milling of the materials. In the present invention, the high energy planetary ball milling is used for ball milling of the processed red mud waste under a speed in the range of 200-300 rpm for 8 hours.

The term "glass fibre" refers to a material comprising numerous fine fibres of glass. The term "glass fibre" and "glass fabric" may be used interchangeably. In the present invention the glass fibre/fabric used is a commercial grade bi-directional glass fabric of density 2.56 g/cc, elongation 4.5%, Young's modulus of 73 GPa, and tensile strength of 2000 MPa.

The term "water holding capacity" used herein refers to the total amount of water materials can hold at field capacity. The technique used in the present invention for the measurement of water holding capacity of the materials is measured in saturated soil paste international pipette technique as well as Keen box method.

The term "flexural modulus" refers to the tendency of the material to resist bending. This is determined from ratio of stress to strain in the flexural deformation. Flexural modulus is calculated from the slope of a stress-strain curve produced by a flexural test (such as the ASTM D790). In the present invention the composite panel has flexural modulus in the range of 2.5-9.5 GPa.

The term "flexural strength" refers to the measure of the flexural strength of a material. It is defined as the stress in a material just before it yields in a flexure test. In the present invention the composite panel has flexural strength in the range of 24-120 MPa.

The term "water absorption" refers to the amount of water absorbed by the material with respect to the weight of the material and is expressed % weight. In the present invention, the water absorption of the composite panel is in the range of 0.20-0.30% with respect to the total weight of the composite panel.

Universally, more than 20 billion tons of industrial waste particulates have been annually produced and India alone produces about one billion tonnes of solid wastes during 2014-2015. Accordingly, the present invention provides a process for making water resistant high strength and efficient X-ray radiation shielding hybrid composite sheet/panel, which comprises industrial waste particulate namely, red mud (50%) reinforced in the epoxy resin, compression of this polymer composite in a mould at a pressure in the range of 20-50 kg/cm$^2$ followed by demoulding at a temperature in the range of 50°-80 C and curing at 60-120° C. in an air oven to obtain water resistant and efficient green hybrid radiation shielding panel/sheet.

The present invention provides a simple process of making X-ray radiation shielding hybrid composite panel that utilizes solid waste raw materials such as red mud which are produced in the process of alumina production from bauxite powder. In the present invention, the process of making X-ray radiation shielding hybrid composite sheet does not contain conventionally used toxic lead metal or its compounds. The process of the present invention, does not involve high temperature annealing or soaking process of raw materials and final product as radiation shielding panels.

The process of making X-ray radiation shielding hybrid composite sheet utilizes solid industrial waste material such as red mud that cause environmental and health problem which can be utilized to make highly value added sheet for application as radiation shielding panels, partition panels, roofing sheet. The process of making X-ray radiation shielding hybrid composite panel/sheet does not involve more than two raw materials i.e. red mud and epoxy resin are only used to fabricate the radiation shielding sheet. Nanoscale size of red mud was used to fabricate the radiation shielding materials.

In the process of the present invention red mud and epoxy resin/polyester and glass fibres are used to fabricate the radiation shielding sheet. In yet another embodiment of the present invention, the process of making X-ray radiation shielding hybrid composite sheet involves a simple and one step calendaring process of glass fibre under low temperature range with polymer matrix of epoxy and resin.

In an embodiment of the present invention there is provided a lead free glossy finish radiation shielding hybrid composite panel comprising: a) 40-70% of industrial waste red mud; and b) 30-60% of epoxy/polyester resin with or without glass fibre, wherein the radiation shielding panel has density in the range of 1.4-2.2 g/cc, and water absorption in the range of 0.20-0.30%.

In an embodiment of the present invention there is provided a lead free glossy finish radiation shielding hybrid composite panel comprising: a) 40-65% of industrial waste red mud; and b) 35-60% of epoxy/polyester resin with or without glass fibre, wherein the radiation shielding panel has density in the range of 1.4-2.2 g/cc, and water absorption in the range of 0.20-0.30%. In another embodiment of the present invention there is provided a lead free glossy finish radiation shielding hybrid composite panel comprising: a) 40-60% of industrial waste red mud; and b) 40-60% of epoxy/polyester resin with or without glass fibre, wherein the radiation shielding panel has density in the range of 1.4-2.2 g/cc, and water absorption in the range of 0.20-0.30%.

In an embodiment of the present invention there is provided a lead free glossy finish radiation shielding hybrid composite panel as disclosed herein, wherein the composite panel has tensile strength in the range of 12-120 MPa; and tensile modulus in the range of 1.5-7.5 GPa.

In an embodiment of the present invention there is provided a lead free glossy finish radiation shielding hybrid composite panel comprising: a) 40-70% of industrial waste red mud; and b) 30-60% of epoxy/polyester resin with or without glass fibre, wherein the radiation shielding panel has density in the range of 1.4-2.2 g/cc, and water absorption in the range of 0.20-0.30% and the composite panel has tensile strength in the range of 12-120 MPa; and tensile modulus in the range of 1.5-7.5 GPa.

In an embodiment of the present invention, there is provided a lead free glossy finish radiation shielding hybrid composite panel as disclosed herein, wherein the industrial waste red mud comprises 10-45% iron oxide, 5-20% alumina, 3-10% silica, 1-1.5% magnesium oxide, 0.5% potassium oxide, 0.5-1% calcium oxide and 0.2% lead oxide.

In an embodiment of the present invention, there is provided a lead free glossy finish radiation shielding hybrid composite panel as disclosed herein, wherein the composite panel has half value layer in the range of 0.36-0.47 cm and 0.48-0.52 cm for X-ray beam energies of 60 and 100 kVp, respectively.

In an embodiment of the present invention there is provided a lead free glossy finish radiation shielding hybrid composite panel comprising: a) 40-70% of industrial waste red mud; and b) 30-60% of epoxy/polyester resin with or without glass fibre, wherein the radiation shielding panel has density in the range of 1.4-2.2 g/cc, water absorption in the range of 0.20-0.30% tensile strength in the range of 12-120 MPa; tensile modulus in the range of 1.5-7.5 GPa; and half value layer in the range of 0.36-0.47 cm and 0.48-0.52 cm for X-ray beam energies of 60 and 100 kVp, respectively In an embodiment of the present invention there is provided a process for making a lead free glossy finish radiation shielding hybrid composite panel as disclosed herein, the process comprising the steps of a) processing of industrial waste red mud followed by hot air oven curing to obtain a processed waste red mud; b) ball milling of the processed waste red mud using high energy planetary ball milling under a speed in the range of 200-300 rpm for a time period of 8 hours to obtain a ball milled processed red mud waste; c) homogeneous mixing of the ball milled processed red mud waste with epoxy/polyester resin to obtain a radiation shielding hybrid composite panel; d) casting under compression moulding of the radiation shielding hybrid composite panel to obtain a glossy finish radiation shielding hybrid composite panel; e) demoulding of the glossy finish radiation shielding hybrid composite panel followed by curing to obtain the lead free radiation shielding hybrid composite panel.

In an embodiment of the present invention there is provided a process for making a lead free glossy finish radiation shielding hybrid composite panel as disclosed herein, the process comprising the steps of a) processing of industrial waste red mud followed by hot air oven curing to obtain a processed waste red mud; b) ball milling of the processed waste red mud using high energy planetary ball milling under a speed in the range of 200-300 rpm for a time period of 8 hours to obtain a ball milled processed red mud waste; c) homogeneous mixing of the ball milled processed red mud waste with epoxy/polyester resin to obtain a radiation shielding hybrid composite panel; d) casting under compression moulding of the radiation shielding hybrid composite panel followed by calendaring of glass fibres and curing of the radiation shielding hybrid composite sheet at a temperature in the range of 25 to 60° C. to obtain a glossy finish radiation shielding hybrid composite panel; and e) demoulding of the glossy finish radiation shielding hybrid composite panel followed by curing to obtain the lead free radiation shielding hybrid composite panel.

In an embodiment of the present invention there is provided a process for making lead free radiation shielding hybrid composite panel as disclosed herein, wherein the processing of industrial waste red mud is processed using hot water, mechanical grinding and hot air oven curing at 60-120° C. for 12-24 hours, and final size of processed waste red mud particulates are in the range of 500 nm-175 μm, density in the range of 1.6-1.9 g/cc, porosity in the range of 30-68% with water holding capacity in the range of 40-45%.

In an embodiment of the present invention there is provided a process for making lead free radiation shielding hybrid composite panel as disclosed herein, wherein homogeneous mixing of the ball milled processed red mud waste with epoxy/polyester resin is carried out at a volume ranging from 30-50% and at a rate of 1000-3000 rpm.

In an embodiment of the present invention there is provided a process for making lead free radiation shielding hybrid composite panel as disclosed herein, wherein in step b, 2-5% of methyl ethyl ketone peroxide (MEKP) and cobalt naphthenate are used as catalyst in case of polyester resin; and 8-10% aliphatic polyamine used as hardener and curing agent in case of epoxy resin.

In an embodiment of the present invention, there is provided a process for making lead free radiation shielding hybrid composite panel as disclosed herein, wherein step d is performed by using compression moulding at a temperature range of 25° C.-60° C. and at a casting pressure in the range of 20-50 kg/cm² in single operation mode.

In an embodiment of the present invention there is provided a process for making lead free radiation shielding hybrid composite panel as disclosed herein, wherein the step d is followed by optionally calendaring of glass fibres and curing of the radiation shielding hybrid composite sheet at a temperature in the range of 25 to 60° C. to obtain a glossy finish red-waste mud radiation shielding hybrid composite sheet and the calendaring of glass fibre is performed by using glass fibre layer as sandwich structure and under casting pressure in the range of 20-50 kg/cm² in single operation mode.

In an embodiment of the present invention, there is provided a process for making lead free radiation shielding hybrid composite panel as disclosed herein, wherein the step e is performed by hot air oven curing at a temperature range of 60-120° C. for 12-24 hours.

In an embodiment of the present invention there is provided a process for making a lead free glossy finish radiation shielding hybrid composite panel comprising: a) 40-70% of industrial waste red mud comprising 10-45% (w/w) iron oxide, 5-20% (w/w) alumina, 3-10% (w/w) silica, 1-1.5% (w/w) magnesium oxide, 0.5% (w/w) potassium oxide, 0.5-1% (w/w) calcium oxide and 0.2% (w/w) lead oxide; and b) 30-60% of epoxy/polyester resin, the process comprising the steps of a) processing of industrial waste red mud at a temperature in the range of 60-120° C. for a time period in the range of 12-24 hour followed by hot air oven curing to obtain a processed waste red mud; b) ball milling of the processed waste red mud using high energy planetary ball milling under a speed of 250 rpm for a time period of 8 hours to obtain a ball milled processed red mud waste; c) homogeneous mixing of the ball milled processed red mud waste with epoxy/polyester resin at a volume ranging from 30-50% and at a rate of 1000-3000 rpm to obtain a radiation shielding hybrid composite panel; d) casting under compression moulding of the radiation shielding hybrid composite panel at a temperature range of 25° C.-60° C. and at a casting pressure in the range of 20-50 kg/cm² in single operation mode to obtain a glossy finish radiation shielding hybrid composite panel; e) demoulding of the glossy finish radiation shielding hybrid composite panel followed by hot air oven curing at a temperature range of 60-120° C. for a time period in the range of 12-24 hours to obtain the lead free radiation shielding hybrid composite panel and wherein in the step b, 2-5% of methyl ethyl ketone peroxide (MEKP) and cobalt naphthenate are used as catalyst in case of polyester resin; and 8-10% aliphatic polyamine used as hardener and curing agent in case of epoxy resin.

In an embodiment of the present invention there is provided a process for making a lead free glossy finish radiation shielding hybrid composite panel comprising: a) 40-70% of industrial waste red mud comprising 10-45% (w/w) iron oxide, 5-20% (w/w) alumina, 3-10% (w/w) silica, 1-1.5% (w/w) magnesium oxide, 0.5% (w/w) potassium oxide, 0.5-1% (w/w) calcium oxide and 0.2% (w/w) lead oxide; and b) 30-60% of epoxy/polyester resin with glass fibre, the process comprising the steps of: a) processing of industrial waste red mud followed by hot air oven curing at a temperature in the range of 60-120° C. for a time period in the range of 12-24 hours to obtain a processed waste red mud; b) ball milling of the processed waste red mud using high energy planetary ball milling under a speed of 250 rpm for a time period of 8 hours to obtain a ball milled processed red mud waste; c) homogeneous mixing of the ball milled processed red mud waste with epoxy/polyester resin at a volume ranging from 30-50% and at a rate of 1000-3000 rpm to obtain a radiation shielding hybrid composite panel; d) casting under compression moulding of the radiation shielding hybrid composite panel followed by calendaring of glass fibres by using glass fibre layer as sandwich structure at a casting pressure in the range of 20-50 kg/cm$^2$ in single operation mode and curing of the radiation shielding hybrid composite sheet at a temperature in the range of 25 to 60° C. to obtain a glossy finish radiation shielding hybrid composite panel; and e) demoulding of the glossy finish radiation shielding hybrid composite panel followed by hot air oven curing at a temperature range of 60-120° C. for a time period in the range of 12-24 hours to obtain the lead free radiation shielding hybrid composite panel and wherein in the step b, 2-5% of methyl ethyl ketone peroxide (MEKP) and cobalt naphthenate are used as catalyst in case of polyester resin; and 8-10% aliphatic polyamine used as hardener and curing agent in case of epoxy resin.

The present invention also provides a lead free radiation shielding panel produced by the said process, wherein the radiation shielding panel has density of 1.4-2.2 g/cc, water absorption in the range of 0.20-0.30%, tensile strength and tensile modulus in the range of 12-120 MPa and 1.5-7.5 GPa and flexural strength and flexural modulus in range of 24-120 MPa and 2.5-9.5 GPa, respectively, half value layer of 0.36-0.47 cm and 0.48-0.52 cm for X-ray beam energies of 60 and 100 kVp respectively.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

EXAMPLES

The disclosure will now be illustrated with the working examples, which is intended to illustrate the working of disclosure and not intended to take restrictively to imply any limitations on the scope of the present disclosure. Unless defined otherwise, all technical and scientific terms used herein have the same meaning as commonly understood to one ordinary person skilled in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

The conventional radiation shielding materials such as glasses fabricated using barium sulphate have very low poor strength, whereas in the present process of invention the use of red mud waste particulates and epoxy resin as hybrid composite sheet shows high mechanical strength. The process of the present invention utilizes waste materials such as red mud which inherently contains the various important radiation shielding element such as iron, aluminium, silicon, and titanium. The process of the present invention obviates the use of toxic lead and its compound, and costly rare earth materials as raw materials. The process of the present invention further obviates the need of high temperature sintering/annealing of raw materials. The radiation shielding radiation sheet panels made in the present invention are less moisture resistant. The process of the present invention for making large scale radiation shielding hybrid composite is very simple in nature and therefore can be utilised for application as X-Ray radiation shielding panels doors, partition, roofing sheet and radiation shielding false ceiling. The following examples are given by way of illustration and therefore should not be construed to limiting the scope of the present invention. Physical and chemical characteristics of industrial waste particulate red mud is shown in Table 1 and Table 2.

TABLE 1

Physical characteristics of industrial waste red mud particulate

| S. No | Physical Properties | Values |
|---|---|---|
| 1 | Particle size (μm) | 0.5-170 |
| 2 | Bulk density (g/cc) | 1.25-1.8 |
| 3 | Specific gravity | 2.2-3.4 |
| 4 | Porosity (%) | 45-68 |
| 5 | pH | 4-12.5 |
| 6 | Water holding capacity (%) | <45 |
| 7 | Electrical conductivity (μmohs/HP) | 450-800 |

TABLE 2

Chemical characteristics of industrial waste red mud particulates

| S. No | Elements | Composition (%) |
|---|---|---|
| | $SiO_2$ | 02-12 |
| | $Fe_2O_3$ | 10-45 |
| | $Al_2O_3$ | 5-20 |
| | CaO | 3-10 |
| | MgO | <01 |
| | $K_2O$ | <0.5 |
| | ZnO | <0.5 |
| | CuO | <0.3 |
| | Loss on Ignition | 10 |

Figure 1:
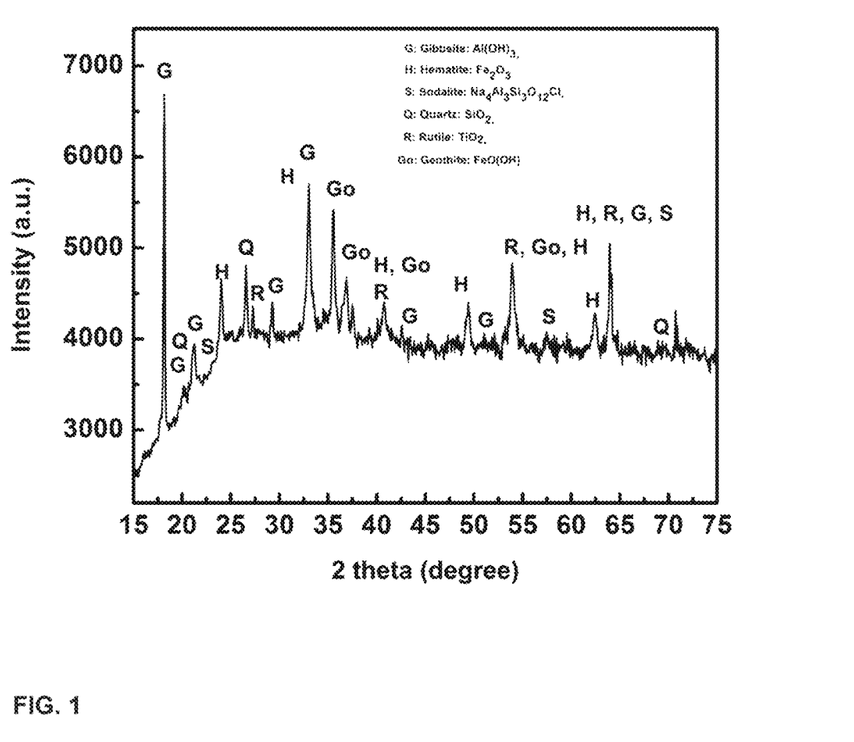
FIG. 1 depicts the X-ray diffraction pattern of red mud waste used as raw materials for the process of making the moisture resistant radiation shielding hybrid composite panels, in accordance with an embodiment of the present invention.

Composition and crystal structure of red mud powder was confirmed by the X-Ray Diffraction method and XRD spectrum is shown in FIG. 1. It was confirmed that red mud waste particulate has four major phases of gibbsite: Al(OH)$_3$ (JCPDS: 33-0018), hematite $Fe_2O_3$ (JCPDS: 86-0550), sodalite $Na_4Al_3Si_3O_{12}Cl$ (JCPDS: 20-0495), Quartz $SiO_2$ (JCPDS no. 33-1161), Rutile $TiO_2$ (JCPDS: 21-1272), and geothite FeO(OH) (JCPDS: 29-0713). The diffraction peaks of red mud powder waste particulate sample well-matched to the corresponding JCPDS. XRD spectrum (FIG. 1) also confirmed that gibbsite and hematite concentration in the sample was high compared to other mineral phases.

Figure 2:
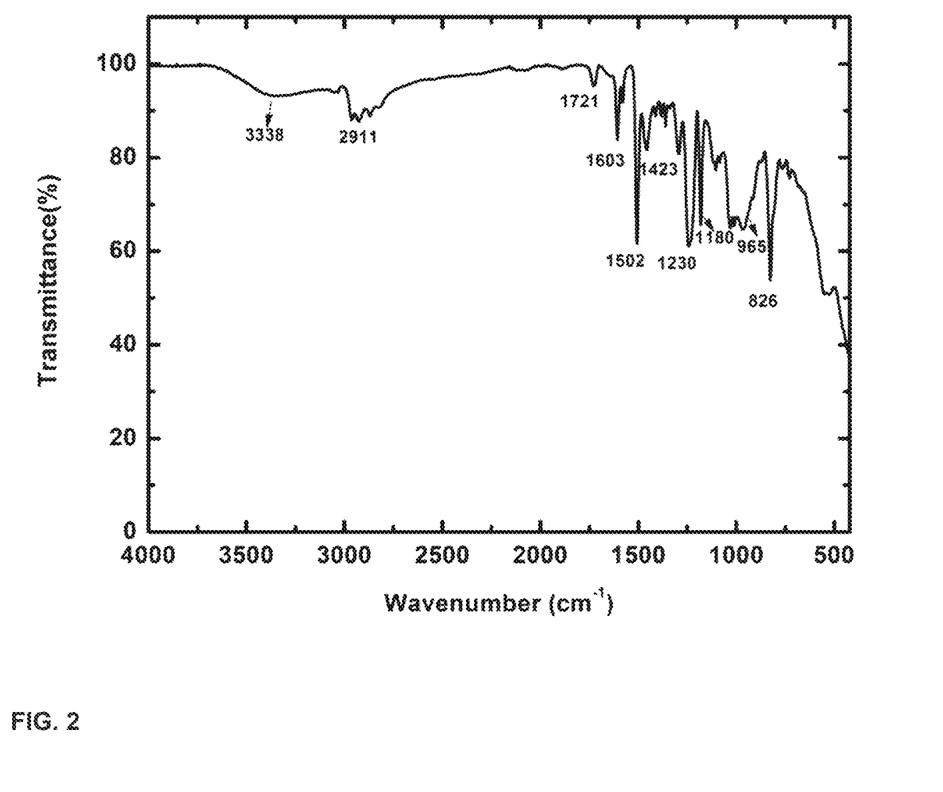
FIG. 2 depicts the Fourier-transform infrared spectroscopy (FTIR) spectrum recorded for the moisture resistant red mud reinforced in epoxy resin based radiation shielding hybrid composite panels, in accordance with an embodiment of the present invention.

The Fourier-transform infrared spectroscopy (FTIR) spectrum was measured from the red mud reinforced epoxy hybrid composite sheet to determine the functional groups (FIG. 2). The broad band at 3500 cm$^{-1}$ is assigned to O—H stretching of hydroxyl groups. The single peak at 2900 cm$^{-1}$ is assigned to C—H stretching of CH$_2$ and CH aromatic and aliphatic. This may be due to epoxy resin. The peak at 1603 cm$^{-1}$ may be taken as the stretching C=C of aromatic rings and peak appeared at 1509 cm$^{-1}$ is assigned as stretching of C—C of aromatic. The sharp peak corresponding to 1036 cm$^{-1}$ is due to the stretching C—O—C of ether. The peaks at 965 and 826 cm$^{-1}$ shows the stretching vibration of C—O of oxirane group and stretching vibration of C—O—C of oxirane group, respectively. The peak at 818 cm$^{-1}$ can be assigned to stretching vibration of Fe$^{3+}$ OH indicating iron rich samples. The band between 1010-850 cm$^{-1}$ occurs due to the presence of metallic oxide. The band around 1180-1090 cm$^{-1}$ appear due to the Si—O asymmetrical stretching vibration indicating presence of quartz (SiO$_2$). The peak at 540 cm$^{-1}$ emerging in FT-IR spectrum shows the presence of Fe—O vibrations, confirming the hematite phase in the hybrid composite sheet. A peak observed at 1000 cm$^{-1}$ is due to stretching of Al—OH indicating the presence of gibbsite Al(OH)$_3$ phase.

The process of making moisture resistant radiation shielding hybrid material involves use of red mud containing 10-45% iron oxide, 5-20% alumina, 3-10% silica, 1-1.5% magnesium oxide, 0.5% potassium oxide, 0.5-1% calcium oxide, 0.2% lead oxide. Raw materials (red mud) are mechanically grinded and then dried using hot water (~60° C.) for 12 hours. The dried and processed red mud was homogeneously mixed with the epoxy polymer at 1000-3000 rpm for 1 hour. The homogenous mixture was casted under compression moulding at temperature of 30-60° C. and at varying casting pressure of 20-50 kg/cm$^2$ in single operation mode, followed hot air oven curing at 60-120° C. for 12-24 hours to fabricate glossy finish moisture resistant X-ray radiation shielding hybrid composite sheet.

Figure 3:
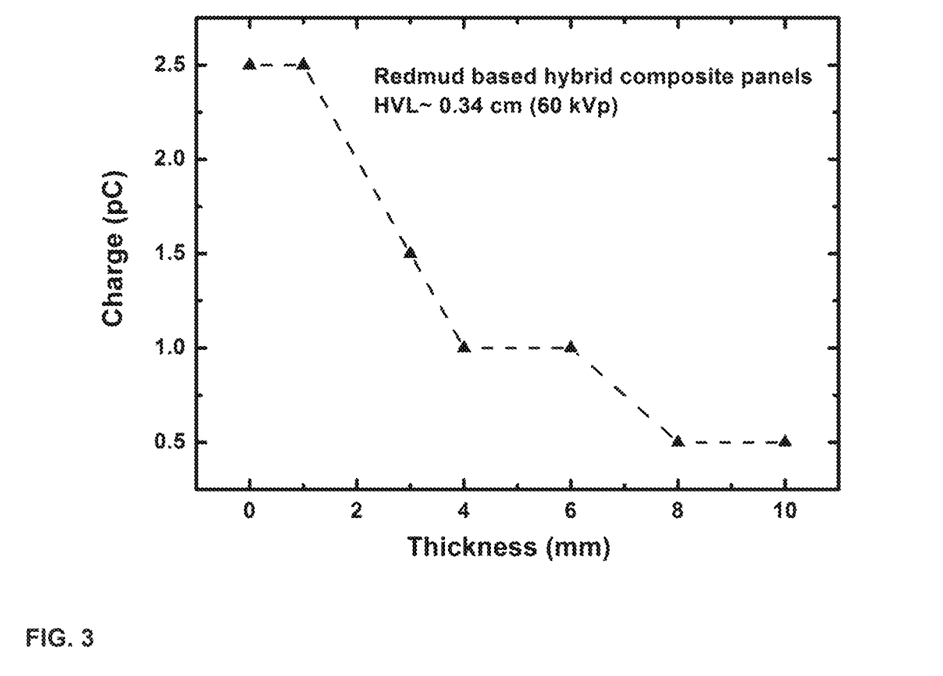
FIG. 3 depicts the experimental results for measuring half value layer under X-ray radiation of energy 60 kVp for the moisture resistant red mud based radiation shielding hybrid composite panels, in accordance with an embodiment of the present invention.
Figure 4:
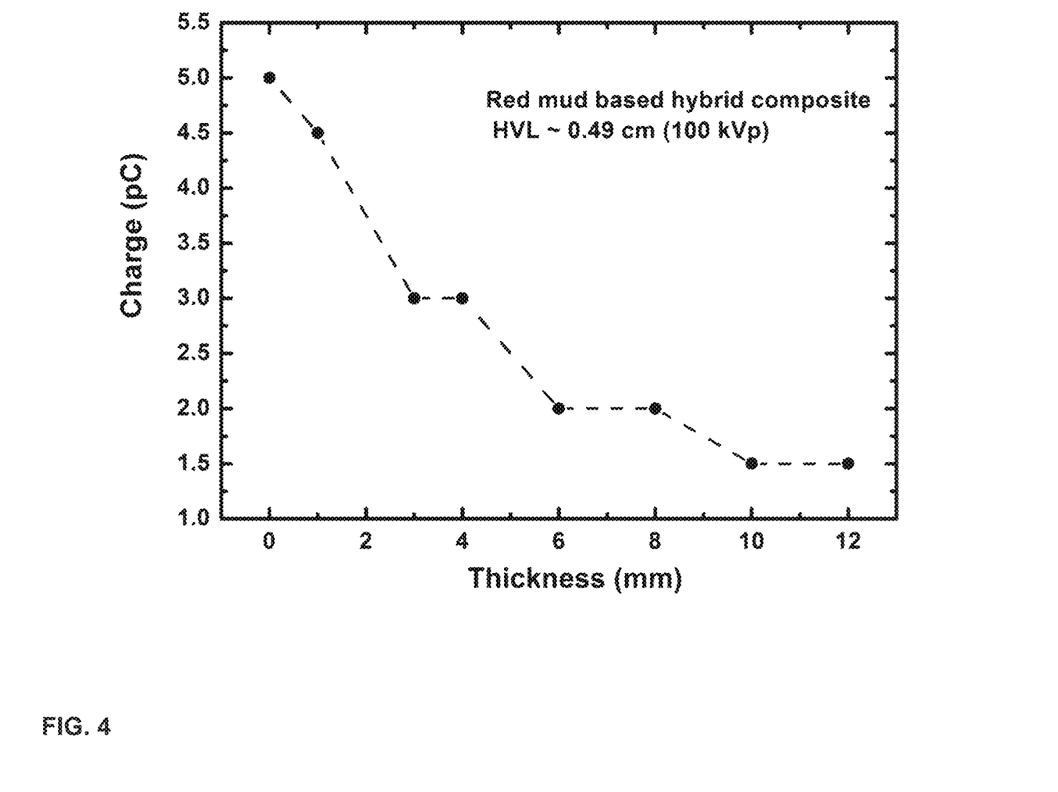
FIG. 4 depicts the experimental results for measuring half value layer under X-ray radiation of energy 100 kVp for the moisture resistant red mud based radiation shielding hybrid composite panels, in accordance with an embodiment of the present invention.
Figure 5:
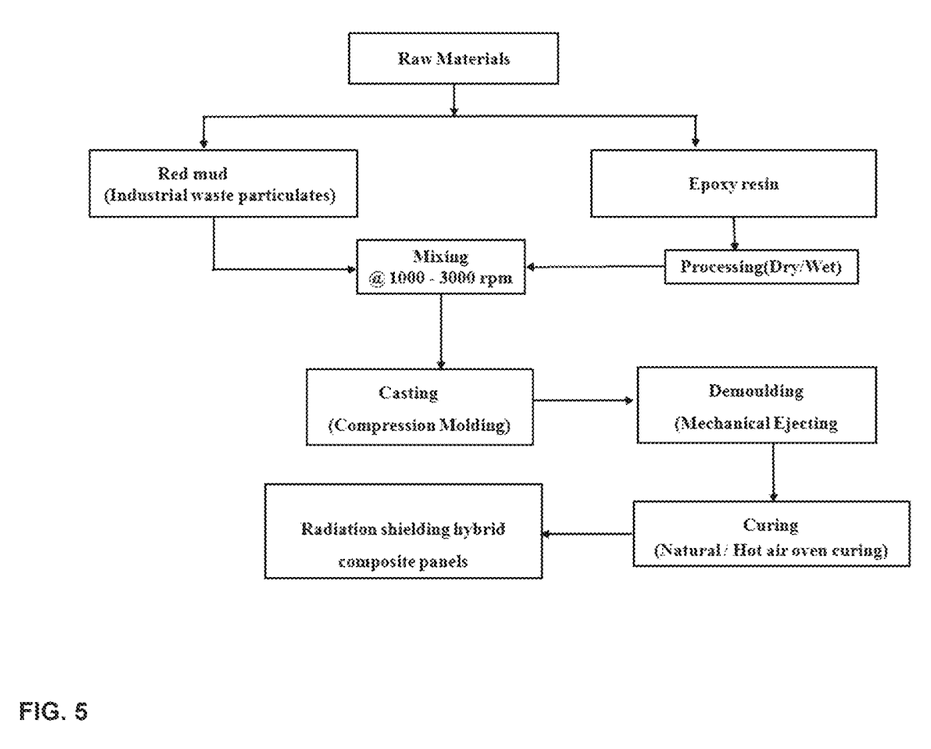
FIG. 5 illustrates an explanatory view for the process of making the high performance radiation shielding red mud reinforced hybrid composite shielding hybrid composite panels in single operation mode, in accordance with an embodiment of the present invention.

The radiation shielding hybrid composite sheets/panels of the present invention were tested for their X-ray attenuation characteristics using high energy electromagnetic X-ray beam radiation of energy of 60 kV with 1 mm Cu-filter and 100 kV with 1 mm Cu-filter. Different thickness (1, 2, 3 and 5 mm) of fabricated red mud reinforced composite sheet/panel were utilised to precisely measure the half value layer corresponds to various X-Ray beam. The half value layer (HVL) of red mud based hybrid composite corresponds to the X-ray beam of energy 60 kV with 1 mm Cu-filter sheet is found to be in range of 0.34-0.35 cm. The half value layer (HVL) of red mud based hybrid composite sheet corresponds to the X-ray beam of energy 100 kV with 1 mm Cu-filter is found to be 0.48-0.50 cm. The obtained graphs for the estimation of half value layer for red mud reinforced hybrid composite sheet corresponds to each 60 and 100 kV energies are given in FIGS. 3 and 4. X-ray radiation shielding properties of waste stones powder (calcite rich samples) based epoxy composite sheet which was fabricated under similar condition is also tested. Radiation shielding composite sheet with epoxy/polyester polymer and calendaring with glass fabric under compressive moulding process was developed in single step. It is clearly evident that no X-Ray shielding/attenuation property is detected for stones waste based hybrid composite samples. Radiation shielding red mud and epoxy based hybrid composite sheet showed the moisture absorption and density of about 0.20-0.30% and 1.4-2.2 g/cc, respectively. The resultant tensile and tensile modulus of radiation shielding composite sheet was in range of 12-120 MPa and 1.5-7.5 GPa respectively under epoxy and polyester resin. The fabricated red mud reinforced radiation shielding hybrid composite showed flexural strength of 24-120 MPa and 2.5-9.5 GPa, respectively.

Example 1

Red Mud Based Radiation Shielding Panels/Sheet in Epoxy/Polyester Resin
Materials Required:

Industrial waste particulates red mud explained above was used as reinforced materials. Polymer used to make glossy finish sheet was commercial grade epoxy/polyester resin. Aliphatic polyamine (Lapox K-6) was used as hardener and curing agent in case of epoxy resin and methyl ethyl ketone peroxide (MEKP) and cobalt naphthenate were used as catalyst in case of polyester resin. Industrial waste particulates used in these glossy finish green hybrid composites have particle size in range of 5-175 µm, density of 1.25-1.8 g/cc, pH in range of 4-12.5, porosity of 45-68% and water holding capacity in range of 40-45%.

Process of Making the Composite Panel of the Present Invention:

Detailed laboratory experimental programme was conducted where in red mud industrial waste particulates were processed. 50-60% of red mud (industrial waste red mud) was used and processed at a temperature of 120° C. for a time period of 12 hours to obtain a processed waste red mud. The processed waste red mud was then ball milled using high energy planetary ball milling under a speed of 250 rpm for a time period of 8 hours to obtain a ball milled processed red mud waste. The obtained ball milled processed red mud waste was homogeneously mixed with the epoxy/polyester resin based binder system using mechanical stirrer at a temperature of 40° C. is carried out with epoxy/polyester resin at a volume ranging from 40-50% and at a rate of 1000 rpm result in radiation shielding hybrid composite panel. Aliphatic polyamine (Lapox K-6) of 8-10% was used as hardener and curing agent in case of epoxy resin and in case of polyester resin methyl ethyl ketone peroxide (MEKP) and cobalt naphthenate were used as catalyst (5%). A compression moulding machine was used to fabricate the radiation shielding hybrid composite panel to produce glossy finish radiation shielding hybrid composite panel. Casting and fabrication of the composite panel was done at temperature of 60° C. and at varying casting pressure from 20-50 kg/cm$^2$ in single operation mode. The fabricated radiation shielding glossy finish red mud panels were cured in an oven at 60° C. for 24 hours. Up-scaling of radiation shielding sheets/panels was also done and glossy finish red mud waste particulates based composites up to the dimension of 220 cm×120 cm with varying thickness of 1.35 mm, 3 mm, 6 mm, 9 mm, 12 mm, and 19 mm) were fabricated.

The following are the some of the measured properties of the above described example for moisture resistant radiation shielding hybrid composite panels/sheet based on red mud waste particulates with epoxy/polyester polymer system.

Density: 1.4-2.0 g/cc
Tensile Strength: 12-45 MPa
Tensile Modulus: 1.5-3.5 GPa
Flexural Strength: 24-60 MPa
Flexural Modulus: 2.5-6.5 GPa
Water Absorption: 0.25-0.30%
Half Value layer (X-Ray Photon—60 kVp): 0.39-0.42 cm Half Value layer (X-Ray Photon—100 kVp): 0.48-0.50 cm Example 2

Red Mud Based Radiation Shielding Panels/Sheet Reinforced with Glass Fabric in Epoxy/Polyester Resin Industrial waste particulates red mud was used as reinforced materials. Polymer used to make glossy finish sheet was commercial grade epoxy and polyester resin. Aliphatic polyamine (Lapox K-6) was used as hardener and curing agent in case of epoxy resin and methyl ethyl ketone peroxide (MEKP) and cobalt naphthenate were used as catalyst for polyester resin. Industrial waste particulates used in these glossy finish green hybrid composites have particle size in range of 5-175 μm, density of 1.25-1.8 g/cc, pH in range of 4-12.5, porosity of 45-68% and water holding capacity in range of 48-68%. Glass Fibres/fabric was used as reinforced materials. Commercial grade bi-directional glass fabric of density 2.56 g/cc, elongation 4.5%, Young's modulus of 73 GPa, and tensile strength of 2000 MPa was used.

Detailed laboratory experimental programme was conducted where in red mud industrial waste particulates were processed and 40-60% of red mud (industrial waste red mud) was used and processed at a temperature of 120 for a time period of 12 hours to obtain a processed waste red mud. The processed waste red mud was then ball milled using high energy planetary ball milling under a speed of 250 rpm for a time period of 8 hours to obtain a ball milled processed red mud waste. The obtained ball milled processed red mud waste was homogeneously mixed with the epoxy/polyester resin based binder system using mechanical stirrer at a temperature of 25° C. is carried out with epoxy/polyester resin at a volume ranging from 30-50% and at a rate of 1000 rpm to result in radiation shielding hybrid composite panel. Aliphatic polyamine (Lapox K-6) of 8% was used as hardener and curing agent in case of epoxy resin and in case of polyester resin methyl ethyl ketone peroxide (MEKP) and cobalt naphthenate were used as catalyst (5%). A compression moulding machine was used to fabricate the radiation shielding hybrid composite panel followed by calendaring of glass fabric/textile sheet over red mud composite panel/sheet (2-10%) to produce glossy finish radiation shielding hybrid composite panel. Casting and fabrication of the composite panel was done at a temperature of 50° C. and at varying casting pressure from 20-50 kg/cm² in single operation mode. The fabricated radiation shielding glossy finish red mud panels were cured in an oven at 80° C. for 24 hours. Up-scaling of radiation shielding sheets/panels was also done and glossy finish red mud waste particulates based composites up to the dimension of 220 cm×120 cm with varying thickness of 1.35 mm, 3 mm, 6 mm, 9 mm, 12 mm, and 19 mm) were fabricated.

The following are the some of the measured properties of above described example for moisture resistant radiation shielding hybrid composite panels based on red mud particulates and epoxy/polyester polymer system Density: 1.6-2.2 g/cc
Tensile Strength: 20-85 MPa
Tensile Modulus: 2.5-6.5 GPa
Flexural Strength: 30-95 MPa
Flexural Modulus: 3.5-8.5 GPa
Water Absorption: 0.25-0.30%
Half Value layer (X-Ray Photon—60 kVp): 0.37-0.42 cm
Half Value layer (X-Ray Photon—100 kVp): 0.47-0.49 cm Example 3

Nanoscale Red Mud Based Radiation Shielding Panels/Sheet in Epoxy/Polyester Resin Industrial waste particulates red mud was used as reinforced materials. Polymer used to make glossy finish sheet was commercial grade epoxy/polyester resin. Aliphatic polyamine (Lapox K-6) was used as hardener and curing agent in case of epoxy resin and methyl ethyl ketone peroxide (MEKP) and cobalt naphthenate were used as catalyst in case of polyester resin. Industrial waste particulates used in these glossy finish green hybrid composites have particle size in range of 500 nm-50 μm, density of 1.25-1.8 g/cc, pH in range of 4-12.5, porosity of 45-68% and water holding capacity in range of 48-50%.

Detailed laboratory experimental programme was conducted where in red mud industrial waste particulates were processed and 40-70% of red mud were used. Red mud inorganic particulates are ball milled with high energy planetary ball milling machine under 250 rpm for 8 hours. Then they were homogeneously mixed with the epoxy resin/polyester resin based binder system using mechanical stirrer at room temperature at rate of 3000 rpm. Aliphatic polyamine (Lapox K-6) of 8-10% was used as hardener and curing agent in case of epoxy resin and in case of polyester resin methyl ethyl ketone peroxide (MEKP) and cobalt naphthenate were used as catalyst (2-5%). A compression moulding machine was used to fabricate the glossy finish red mud reinforced polymer composite sheet. Casting and fabrication of the composite sheet was done at varying temperature of 60° C. and at varying casting pressure from 20-50 kg/cm² in single operation mode. The fabricated radiation shielding glossy finish red mud sheets were cured in an oven at 60° C. for 24 hours. Up-scaling of radiation shielding sheets was also done and glossy finish red mud particulates with epoxy/resin system up to the dimension of 220 cm×120 cm with varying thickness of 1.35 mm, 3 mm, 6 mm, 9 mm, 12 mm, and 19 mm) were fabricated.

The following are the some of the measured properties of above described example for moisture resistant radiation shielding hybrid composite panels based on red mud particulates and epoxy/polyester polymer system.

Density: 1.6-2.1 g/cc
Tensile Strength: 22-50 MPa
Tensile Modulus: 2.0-4.5 GPa
Flexural Strength: 30-65 MPa
Flexural Modulus: 3.0-6.5 GPa
Water Absorption: 0.20-0.3%
Half Value layer (X-Ray Photon—60 kVp): 0.39-0.47 cm
Half Value layer (X-Ray Photon—100 kVp): 0.48-0.52 cm Example 4

Nanoscale Red Mud Based Radiation Shielding Panels/Sheets Reinforced with Glass Fabric in Epoxy/Polyester Resin Industrial waste particulates red mud was used as reinforced materials. Polymer used to make glossy finish sheet was commercial grade epoxy and polyester resin. Aliphatic polyamine (Lapox K-6) was used as hardener and curing agent in case of epoxy resin and methyl ethyl ketone peroxide (MEKP) and cobalt naphthenate were used as catalyst in case of polyester resin. Industrial waste particulates used in these glossy finish green hybrid composites have particle size in range of 500 nm-5 μm, density of 1.25-1.8 g/cc, pH in range of 4-12.5, porosity of 45-68% and water holding capacity in range of 48-68%. Glass Fibres/fabric was used as reinforced materials. Commercial grade bi-directional glass fabric of density 2.56 g/cc, elongation 4.5%, Young's modulus of 73 GPa, and tensile strength of 2000 MPa was used.

Detailed laboratory experimental programme was conducted where in red mud industrial waste particulates were processed and 40-60% of red mud were used. Then they were homogeneously mixed with the epoxy resin/polyester resin based binder system using mechanical stirrer at room temperature. Aliphatic polyamine (Lapox K-6) of 8-10% was used as hardener and curing agent in case of epoxy resin and in case of polyester resin methyl ethyl ketone peroxide (MEKP) and cobalt naphthenate were used as catalyst (5%). Red mud inorganic particulates are ball milled with high energy planetary ball milling machine under 250 rpm for 8 hours. Glass fabric of 2-10% was used as reinforced materials in radiation shielding materials. A compression moulding machine was used to fabricate the glossy finish red mud reinforced polymer composite sheet. Casting and fabrication of the composite sheet was done at a temperature of 40° C. and at varying casting pressure from 20-50 kg/cm² in single operation mode. Calendaring of glass fabric/textile sheet was done over red mud composite sheet. (2-10%) The fabricated radiation shielding glossy finish red mud sheets reinforced with glass fabric sheet were cured in an oven at 60-120° C. for—12 hours. Up-scaling of radiation shielding hybrid composite sheets was also done and glossy finish red mud particulates with epoxy/resin system up to the dimension of 220 cm×120 cm with varying thickness.

The following are the some of the measured properties of above described example for moisture resistant radiation shielding hybrid composite panels/sheets based on red mud and epoxy/polyester polymer system.

Density: 1.6-2.4 g/cc
Tensile Strength: 25-120 MPa
Tensile Modulus: 3.0-7.5 GPa
Flexural Strength: 35-120 MPa
Flexural Modulus: 4.5-9.5 GPa
Water Absorption: 0.25-0.30%
Half Value layer (X-Ray Photon—60 kVp): 0.36-0.43 cm
Half Value layer (X-Ray Photon—100 kVp): 0.47-0.51 cm The red mud based hybrid composites materials for radiation shielding panels and doors are not yet developed globally. In the present invention, the mixing processing of red mud, mixing with polymer in optimized rpm condition such as 1000-3000 rpm is essential to make the rheological/viscosity properties of composites for preparation of radiation composite sheet with claimed physical property. Further casting temperature and pressure values as disclosed in the present invention is important as it is not possible to fabricate the glossy finish polymer composite with red mud in epoxy and polyester resin without applying given temperature and pressure range and without processing of red mud powder. Moreover, high energy planetary ball milling process is also required to get specific property of the final product. Also, the invention further provides a process to make the radiation shielding panels through calendaring of layered glass fabric between radiation shielding hybrid composite sheet.

Advantages of the Present Invention

The process of present invention utilizes industrial wastes especially red mud generated in aluminium production and epoxy polymer as binder and obviates the need of use of toxic lead materials and rare earth compounds. The process of the present invention significantly utilizes waste materials containing the various important elements such as silicon, aluminum, titanium and specially iron which are necessary for designing radiation shielding materials. The conventional radiation shielding glass panels based on barium have low mechanical strength such as tensile strength, whereas in the present invention radiation shielding panels have very high tensile and flexural strength which are capable of withstanding relatively high pressure and load/impact. The process of the present invention does not involve high temperature annealing and the metal oxides present in the waste materials act as active components for obtaining the desired radiation shielding properties. The process of the present invention is carried out at a low temperature in the range of only 60-80° C. at casting pressure of 20-50 kg/cm² in case of compressive moulding preparation technique. The process of the present invention is carried out at a low temperature range along with calendaring of glass fabric as reinforce materials as sandwich structures. The process of the present invention helps in converting waste materials into value added product as moisture red mud highly strength radiation shielding panels. Further, the present invention provides the radiation shielding panels that can be fabricated in a single operation

We claim:

1. A lead free glossy finish radiation shielding hybrid composite panel comprising:
   a) 40-70% of industrial waste red mud by weight; and
   b) 30-60% of epoxy/polyester resin by volume with or without glass fibre, wherein the composite panel has density in the range of 1.4-2.2 g/cc; water absorption in the range of 0.20-0.30%; tensile strength in the range of 12-120 MPa; tensile modulus in the range of 1.5-7.5 GPa; and half value layer in the range of 0.36-0.47 cm and 0.48-0.52 cm for X-ray beam energies of 60 and 100 kVp, respectively.

2. A process for making the composite panel as claimed in claim 1 through compressive moulding technique comprising the steps of:
   a) processing of industrial waste red mud followed by hot air oven curing to obtain a processed waste red mud;
   b) ball milling of the processed waste red mud using high energy planetary ball milling under a speed in the range of 200-300 rpm for a time period of 8 hours to obtain a ball milled processed red mud waste;
   c) homogeneous mixing of the ball milled processed red mud waste with epoxy/polyester resin to obtain a radiation shielding hybrid composite panel;
   d) casting under compression moulding of the radiation shielding hybrid composite panel to obtain a glossy finish radiation shielding hybrid composite panel; and
   e) demoulding of the glossy finish radiation shielding hybrid composite panel followed by curing to obtain the lead free glossy finish radiation shielding hybrid composite panel composite panel.

3. The process as claimed in claim 2, wherein the step d is followed by optionally calendaring of glass fibres and curing of the radiation shielding hybrid composite panel at a temperature in the range of 25 to 60° C. to obtain the glossy finish radiation shielding hybrid composite panel.

4. The process as claimed in claim 2, wherein the industrial waste red mud comprises 10-45% (w/w) iron oxide, 5-20% (w/w) alumina, 3-10% (w/w) silica, 1-1.5% (w/w) magnesium oxide, 0.5% (w/w) potassium oxide, 0.5-1% (w/w) calcium oxide, and 0.2% (w/w) lead oxide.

5. The process as claimed in claim 2, wherein the step a is carried out at a temperature in the range of 60-120° C. for a time period in the range of 12-24 hours.

6. The process as claimed in claim 2, wherein the processed waste red mud is in the size in the range of 500 nm-175 µm; density in the range of 1.6-1.9 g/cc; porosity in the range of 30-68% and water holding capacity in the range of 40-45%.

7. The process as claimed in claim 2, wherein the step c is carried out with epoxy/polyester resin at a volume ranging from 30-50% and at a rate of 1000-3000 rpm.

8. The process as claimed in claim 2, wherein in the step b, 2-5% of methyl ethyl ketone peroxide (MEKP) and cobalt naphthenate are used as catalyst in case of polyester resin; and 8-10% aliphatic polyamine used as hardener and curing agent in case of epoxy resin.

9. The process as claimed in claim 2, wherein the step d is performed by using compression molding at a temperature range of 25° C.-60° C. and at a casting pressure in the range of 20-50 kg/cm² in single operation mode.

10. The process as claimed in claim 3, wherein the calendaring of glass fibre is performed by using glass fibre layer as sandwich structure and under casting pressure in the range of 20-50 kg/cm² in single operation mode.

11. The process as claimed in claim 2, wherein the step e is performed by hot air oven curing at a temperature range of 60-120° C. for a time period in the range of 12-24 hours.

12. A lead free glossy finish radiation shielding hybrid composite panel produced by the process as claimed in claim 2, wherein the radiation shielding hybrid composite panel has density in the range of 1.4-2.2 g/cc, water absorption in the range of 0.20-0.30%, tensile strength and tensile modulus in the range of 12-120 MPa and 1.5-7.5 GPa; flexural strength and flexural modulus in the range of 24-120 MPa and 2.5-9.5 GPa, respectively, half value layer of 0.36-0.47 cm and 0.48-0.52 cm for X-ray beam energies of 60 and 100 kVp respectively.

* * * * *